US006639609B1

(12) United States Patent
Hayashi (10) Patent No.: US 6,639,609 B1
(45) Date of Patent: Oct. 28, 2003

(54) INFORMATION PROCESSING APPARATUS, METHOD THEREFOR, AND COMPUTER PROGRAM

(75) Inventor: Shoichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/577,749

(22) Filed: May 23, 2000

(30) Foreign Application Priority Data

May 25, 1999 (JP) ............................................. 11-144643

(51) Int. Cl.$^7$ ................................................. G09G 5/00
(52) U.S. Cl. ......................... 345/745; 345/760; 345/733
(58) Field of Search ................................ 345/745, 760, 345/733; 709/217, 219, 227, 228

(56) References Cited

U.S. PATENT DOCUMENTS

| | | | |
|---|---|---|---|
| 6,118,458 A | * 9/2000 | Kawai et al. | 345/473 |
| 6,211,877 B1 | * 4/2001 | Steele et al. | 345/804 |
| 6,219,669 B1 | * 4/2001 | Haff et al. | 707/201 |

FOREIGN PATENT DOCUMENTS

WO   WO 98 26571   6/1998

OTHER PUBLICATIONS

Wright, Matthew. "cookie.lib" Copyright 1996. Retrieved from the Internet: <URL: http://www.cookiecentral.com/content.phtml?area=2&id=8>. Retreived on Nov. 14, 2002.*
Wright, Matthew. "ccounter.pl" Copyright 1996. Retrieved from the Internet: <URL: http://www.cookiecentral.com/content.phtml?area=2&id=8>. Retreived on Nov. 14, 2002.*
Wright, Matthew. "Readme" Copyright 1996. Retrieved from the Internet: <URL: http://www.cookiecentral.com/content.phtml?area=2&id=8>. Retreived on Nov. 14, 2002.*
"HTTP Cookie Headers" Dec. 4, 1997. Retreived from the Internet: URL: http://www.webreference.com/js/column8/http.html>. Retreived on Nov. 14, 2002.*
"Extreme Tracking." Dec. 5, 1998. Retrieved from the Internet: <URL: http://web.archive.org/web/*/http://extreme-dm.com/tracking/ Retreived on Nov. 14, 2002.*
"A Personal Counter" 'Online! Dec. 4, 1997 XP002158934 Retrieved from the Internet: <URL: http://www.webreference.com/js/column8/counter.html> 'retrieved on Jan. 31, 2001!.
Pitkow J: "In search of reliable usage data on the WWW" Sixth International World Wide Web Conference, vol. 29, No. 8–13, pp. 1343–1355, XP004095329 Computer Networks and ISDN Systems, Sep. 1997, Elsevier, Netherlands ISSN: 0169–7552.
Patent Abstracts of Japan vol. 1999, No. 09, Jul. 30, 1999 & JP 11 098134 A (Nippon Telegraph & Telephone Corp; NTT Advanced Technology Corp), Apr. 9, 1999.

* cited by examiner

Primary Examiner—John Cabeca
Assistant Examiner—Blaine Basom
(74) Attorney, Agent, or Firm—Frommer Lawrence & Haug LLP; William S. Frommer; Hans R. Mahr (57) ABSTRACT

A graphical access counter for encouraging users to repeatedly access a homepage is provided. In a flower-counter-number display area of the access counter, a flower counter value incremented by each access and reset at a predetermined period is displayed. In a flower-counter-image display area, a plant image growing in accordance with the flower counter value is displayed. In a cumulative-counter display area, a cumulative counter value incremented by each access is displayed. In a comment display area, a message from a sever is displayed. The flower counter value and the cumulative counter value are incremented only by one a day even if the corresponding homepage is accessed a plurality of times within the same day.

16 Claims, 11 Drawing Sheets

INFORMATION PROCESSING APPARATUS, METHOD THEREFOR, AND COMPUTER PROGRAM

BACKGROUND OF THE INVENTION

1. Field of the Invention

The present invention relates to information processing apparatuses, methods therefor, and computer programs, and more particularly, to an information processing apparatus and a method therefor suitable for use in counting the number of accesses to a homepage by each person. The invention also relates to a computer program implementing the above-described method.

2. Description of the Related Art

Figure 1:
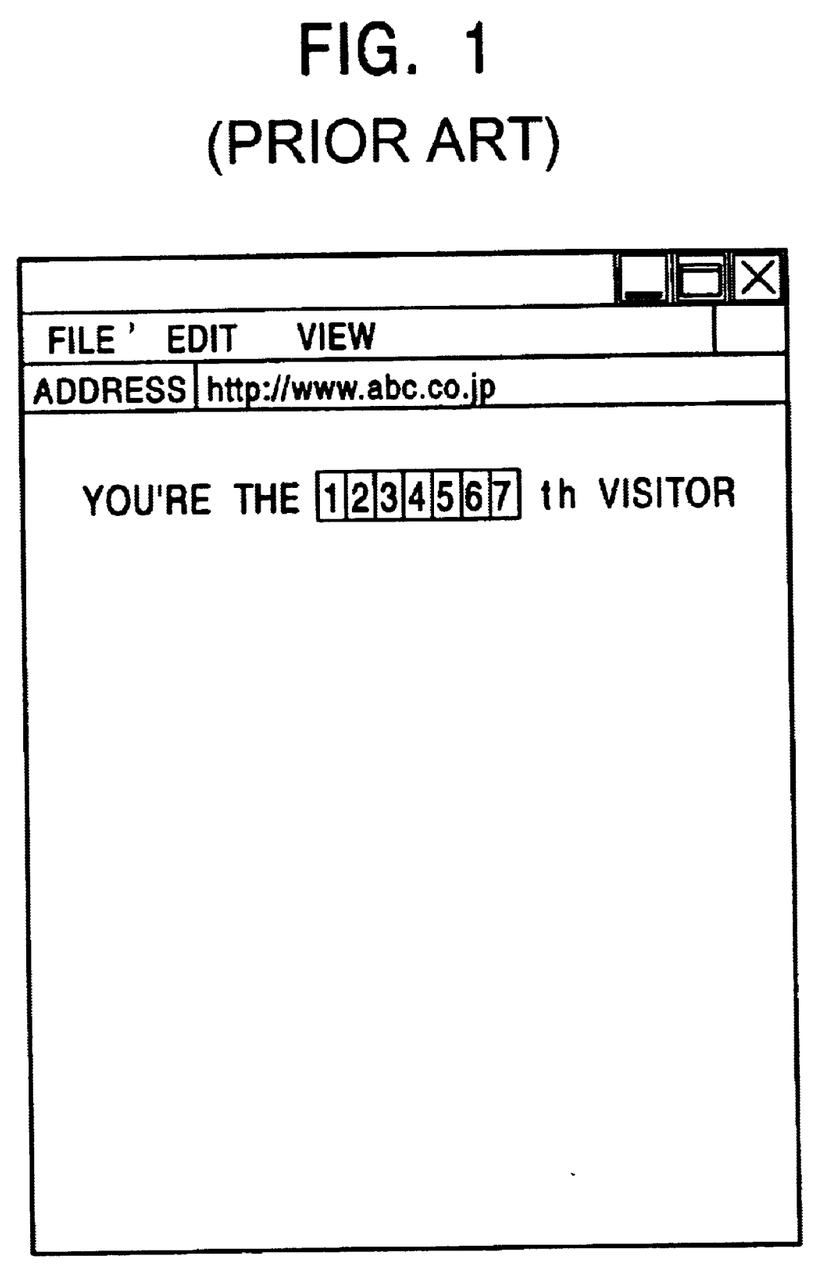
FIG. 1 illustrates an example of conventional access counters.

A typical access counter installed in an Internet homepage, such as the one shown in FIG. 1, indicates the number of accesses to this homepage by unspecified people. This type of access counter is mainly for monitoring the popularity of the homepage by the creator thereof and also for demonstrating to people who have accessed the homepage its degree of popularity.

Some access counters not only count the number of accesses made by unspecified people, but also count the number of accesses by a specific person (creator of the homepage), so that a virtual electronic organism grows on the homepage in accordance with the number of accesses, and a corresponding graphic image is displayed.

This type of graphical access counter can encourage the creator of this homepage to access the homepage again, but not to unspecified people who have accessed the homepage.

SUMMARY OF THE INVENTION

Accordingly, in view of the above background, it is an object of the present invention to provide a graphical access counter which counts the number of accesses made to a homepage by each unspecified person and executes a predetermined event in accordance with the number of accesses, thereby encouraging people to access the homepage again.

In order to achieve the above object, according to one aspect of the present invention, there is provided an information processing apparatus to be accessed from a plurality of information terminals via a network. The information processing apparatus includes a generating component for generating first information in response to an access from one of the information terminals and for supplying the first information to the information terminal. A receiving component receives the first information sent from the information terminal. An incrementing component increments the number of accesses and the cumulative number of accesses, which are contained in the first information received by the receiving component, according to a predetermined algorithm. An initializing component initializes the number of accesses at a predetermined period. A sending component sends image information, indicating a virtual organism which grows in accordance with the number of accesses incremented by the incrementing component, the number of accesses, and the cumulative number of accesses, to the information terminal. An event executing component executes a predetermined event in accordance with one of the number of accesses and the cumulative number of accesses incremented by the incrementing component.

The aforementioned incrementing component may increment the number of accesses by one a day in response to an access from the information terminal.

The information processing apparatus may further include a detection component for detecting an abnormality of the first information.

According to another aspect of the present invention, there is provided an information processing method for use in an information processing apparatus to be accessed from a plurality of information terminals via a network. The information processing method includes: a generating step of generating first information in response to an access from one of the information terminals and of supplying the first information to the information terminal; a receiving step of receiving the first information sent from the information terminal; an incrementing step of incrementing the number of accesses and the cumulative number of accesses, which are contained in the first information received in the receiving step, according to a predetermined algorithm; an initializing step of initializing the number of accesses at a predetermined period; a sending step of sending image information, indicating a virtual organism which grows in accordance with the number of accesses incremented in the incrementing step, the number of accesses, and the cumulative number of accesses, to the information terminal; and an event executing step of executing a predetermined event in accordance with one of the number of accesses and the cumulative number of accesses incremented in the incrementing step.

According to still another aspect of the present invention, there is provided a computer program for processing accesses made from a plurality of information terminals via a network. The computer program includes: a generating step of generating first information in response to an access from one of the information terminals and of supplying the first information to the information terminal; a receiving step of receiving the first information sent from the information terminal; an incrementing step of incrementing the number of accesses and the cumulative number of accesses, which are contained in the first information received in the receiving step, according to a predetermined algorithm; an initializing step of initializing the number of accesses at a predetermined period; a sending step of sending image information, indicating a virtual organism which grows in accordance with the number of accesses incremented in the incrementing step, the number of accesses, and the cumulative number of accesses, to the information terminal; and an event executing step of executing a predetermined event in accordance with one of the number of accesses and the cumulative number of accesses incremented in the incrementing step.

According to the information processing apparatus, the information processing method, and the computer program, it is possible to implement a graphical access counter for encouraging users to repeatedly access a homepage.

DESCRIPTION OF THE PREFERRED EMBODIMENTS

The present invention is described in detail below through illustration of a preferred embodiment.

Figure 2:
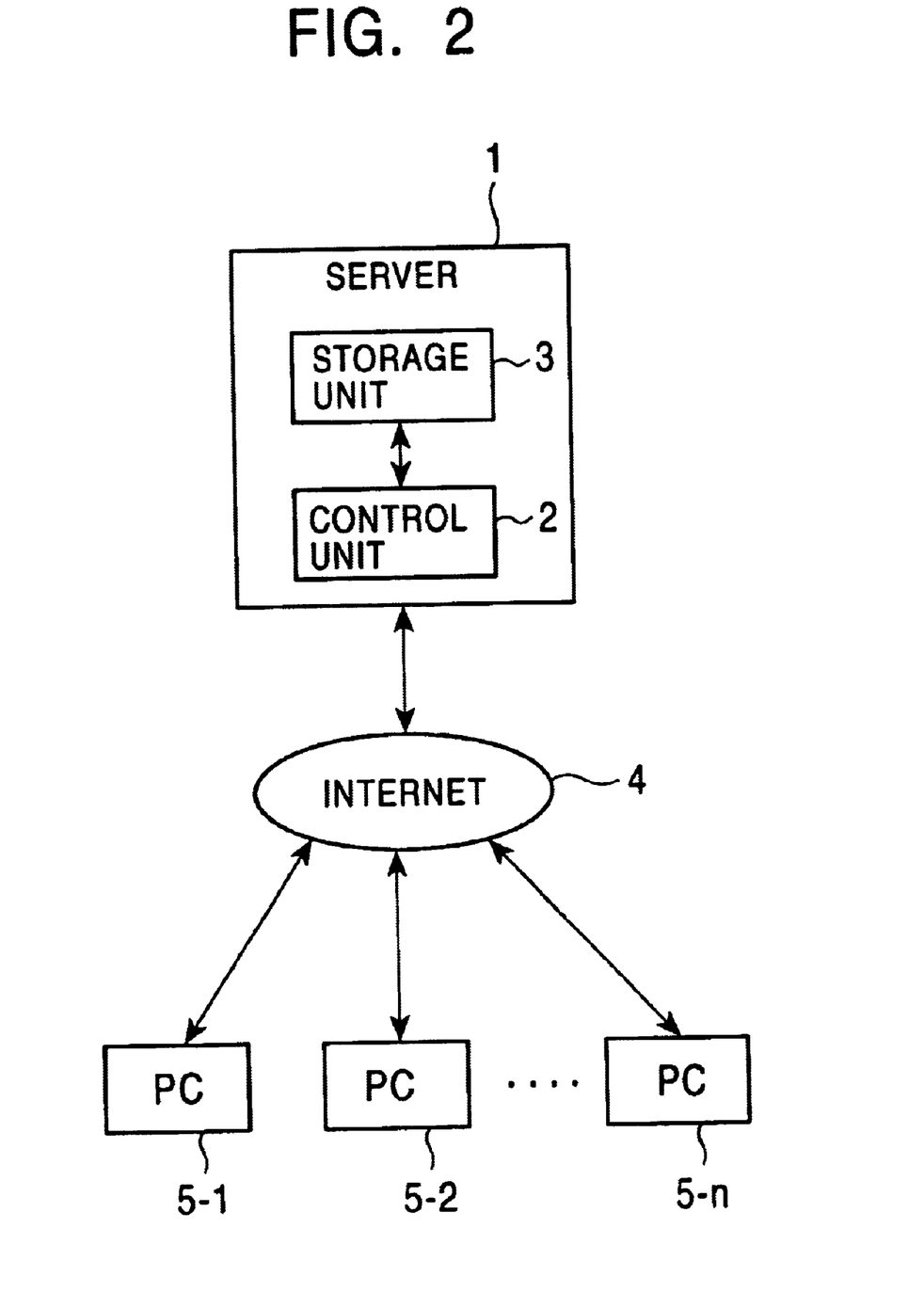
FIG. 2 is a block diagram illustrating an example of the configuration of an information processing system incorporating the present invention.

An example of the configuration of an information processing system incorporating the present invention is discussed below with reference to FIG. 2. This information processing system is formed of a server 1 and a plurality of personal computers 5-1 through 5-n (hereinafter simply referred to as "PC 5" unless it is necessary to distinguish the PCs 5-1 through 5-n from each other) connected to the server 1 via the Internet 4.

The server 1 is formed of a control unit 2 and a storage unit 3. The control unit 2 executes predetermined processing according to a server program and a common gateway interface (CGI) script stored in the storage unit 3. The storage unit 3 stores the server program, a hypertext markup language (HTML) file implementing homepage images, a CGI script called from the HTML file, etc. The PC 5 can be connected to a predetermined server via the Internet 4 by running a world wide web (WWW) browser stored on a built-in hard disk.

The operation of this information processing system is as follows. When the WWW browser run by the PC 5-1 accesses a homepage set in the server 1 via the Internet 4, the control unit 2 of the server 1 reads the homepage HTML file from the storage unit 3 and sends it to the PC 5-1 via the Internet 4. The WWW browser of the PC 5-1 receives and opens the HTML file to display a corresponding homepage image (FIG. 3) on a display unit (not shown).

Figure 3:
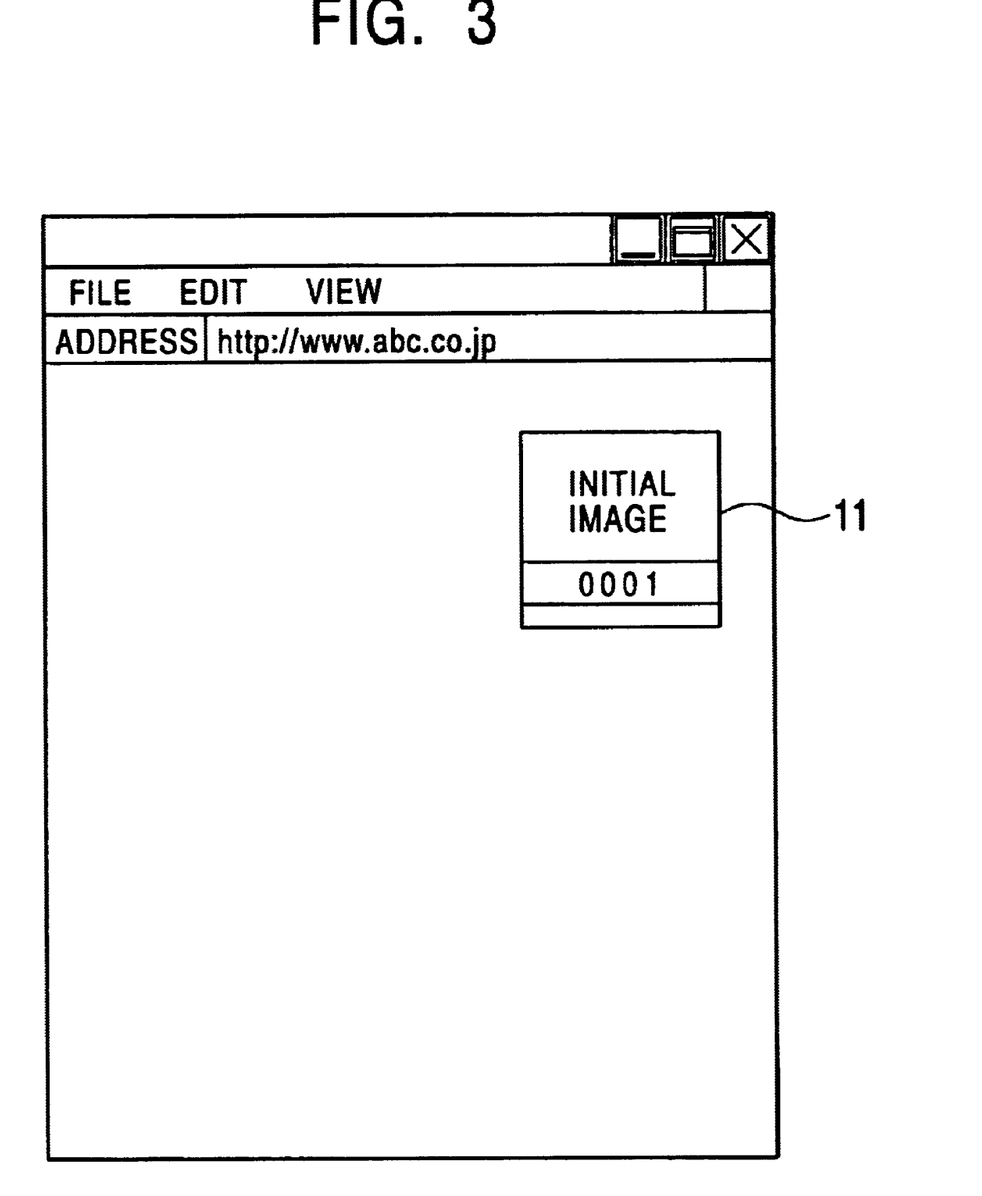
FIG. 3 illustrates an access counter 11 installed in a homepage set in a server 1.
Figure 4:
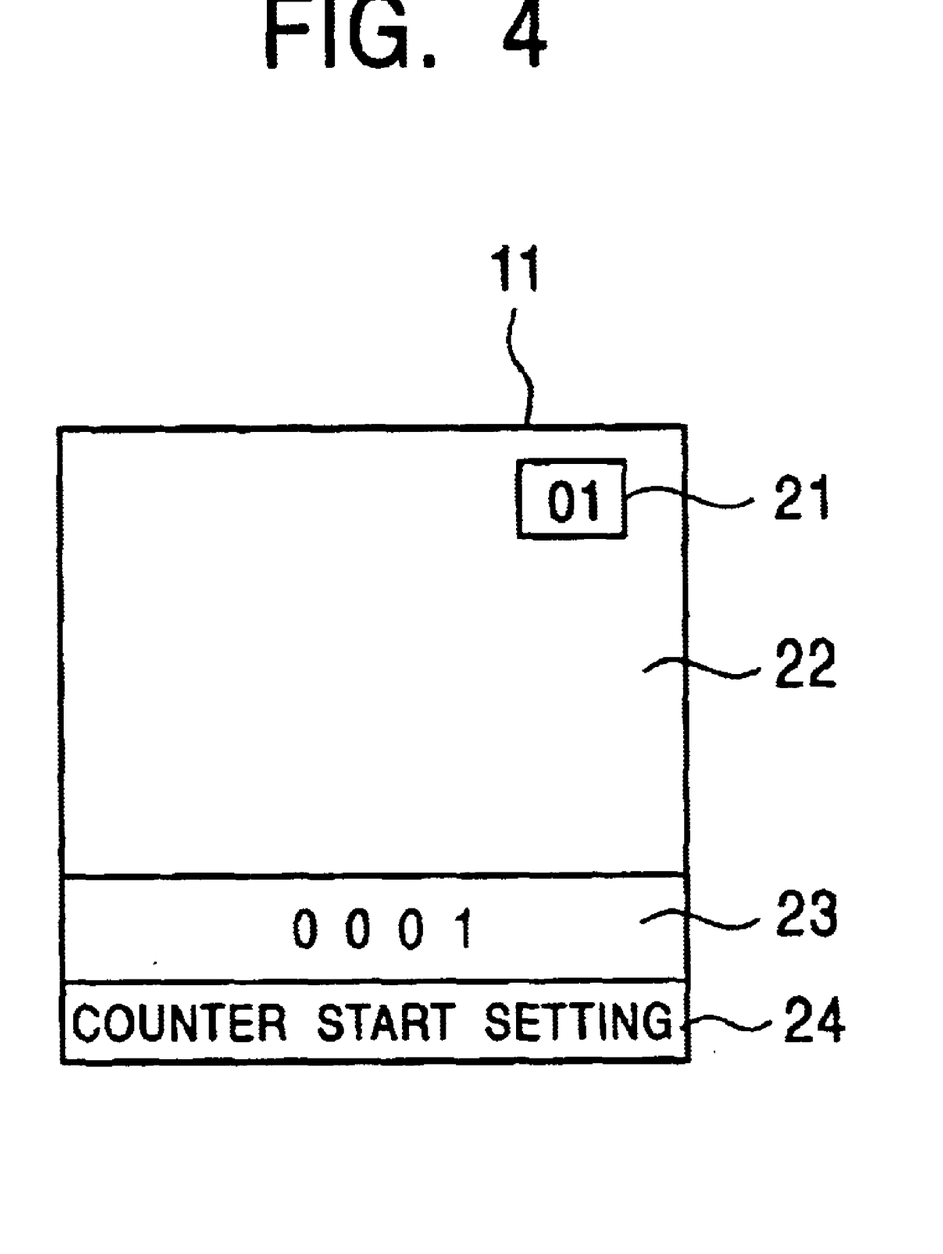
FIG. 4 illustrates details of the access counter 11.

FIG. 3 illustrates the homepage image corresponding to the HTML file sent from the server 1 to the PC 5-1 via the Internet 4. FIG. 3 shows that an access counter 11 is installed in this homepage. The access counter 11 is used for counting the number of accesses to this homepage from the PC 5-1, and is formed of, as shown in FIG. 4, a flower-counter-number display area 21, a flower-counter-image display area 22, a cumulative-counter display area 23, and a comment display area 24.

In the flower-counter-number display area 21, a flower counter value incremented by each access and reset at a predetermined period (for example, every 32 accesses) is indicated. In the flower-counter-image display area 22, a plant image grown in accordance with the flower counter value is displayed. In the cumulative-counter display area 23, a cumulative counter value incremented by each access is indicated. In the comment display area 24, a message from the server 1 is shown. The flower counter value and the cumulative counter value are incremented only by one a day even if this homepage is accessed a plurality of times within the same day.

The counter display processing performed by this information processing system is described below with reference to the flow chart of FIG. 5. This counter display processing is started when the WWW browser run by the PC 5 accesses the homepage set in the server 1 and opens the HTML file, containing a command for calling the CGI script, supplied from the server 1 via the Internet 4.

Upon opening the HTML file by the WWW browser of the PC 5, in step S1, the CGI script executed by the control unit 2 of the server 1 requests the WWW browser to send a cookie. The cookie is a file which is sent to a WWW browser registered in access counter services and which is stored in the PC 5, in which ID information of the corresponding PC 5, the last access time and date, the cumulative counter value, the type of seed, the flower counter value, an event participating flag (described in detail below), and so on, are encrypted.

In response to the request for sending the cookie, the cookie which has already been sent from the server 1 and stored in the PC 5 is sent to the server 1 via the Internet 4. If, however, the cookie is not stored in the PC 5, i.e., if the WWW browser of the PC 5 is not registered in the access counter services, the corresponding information is sent to the server 1.

The CGI script determines in step S2 whether the cookie has been received from the PC 5. If the outcome of step S2 is no (if information indicating that the WWW browser of the PC 5 is not registered in the access counter services has been received), the process proceeds to step S3.

In step S3, the CGI script sends initial image data of the access counter 11 shown in FIG. 4 to the WWW browser via the Internet 4. The WWW browser then displays the initial image of the access counter 11 on the display unit.

In the comment display area 24 of the initial image of the access counter 11, a message "counter start setting", which is to be clicked when registering in the access counter services, is displayed. When the message "counter start setting" is clicked, the corresponding information is sent to the CGI script via the Internet 4.

The CGI script waits until the WWW browser user is registered in the access counter services (until the counter start is set) by clicking the message "counter start setting" of the comment display area 24. If the CGI script determines that the counter start setting is completed, the process proceeds to step S4.

In step S4, the CGI script initializes the cumulative counter value to one. In step S5, the CGI script initializes the flower counter value to one, and sets the event participating flag to 0. In step S6, the CGI script transmits image data of a seed selection window 31 (FIG. 6) to the WWW browser via the Internet 4, and the WWW browser displays the seed selection window 31 on the display unit.

Figure 6:
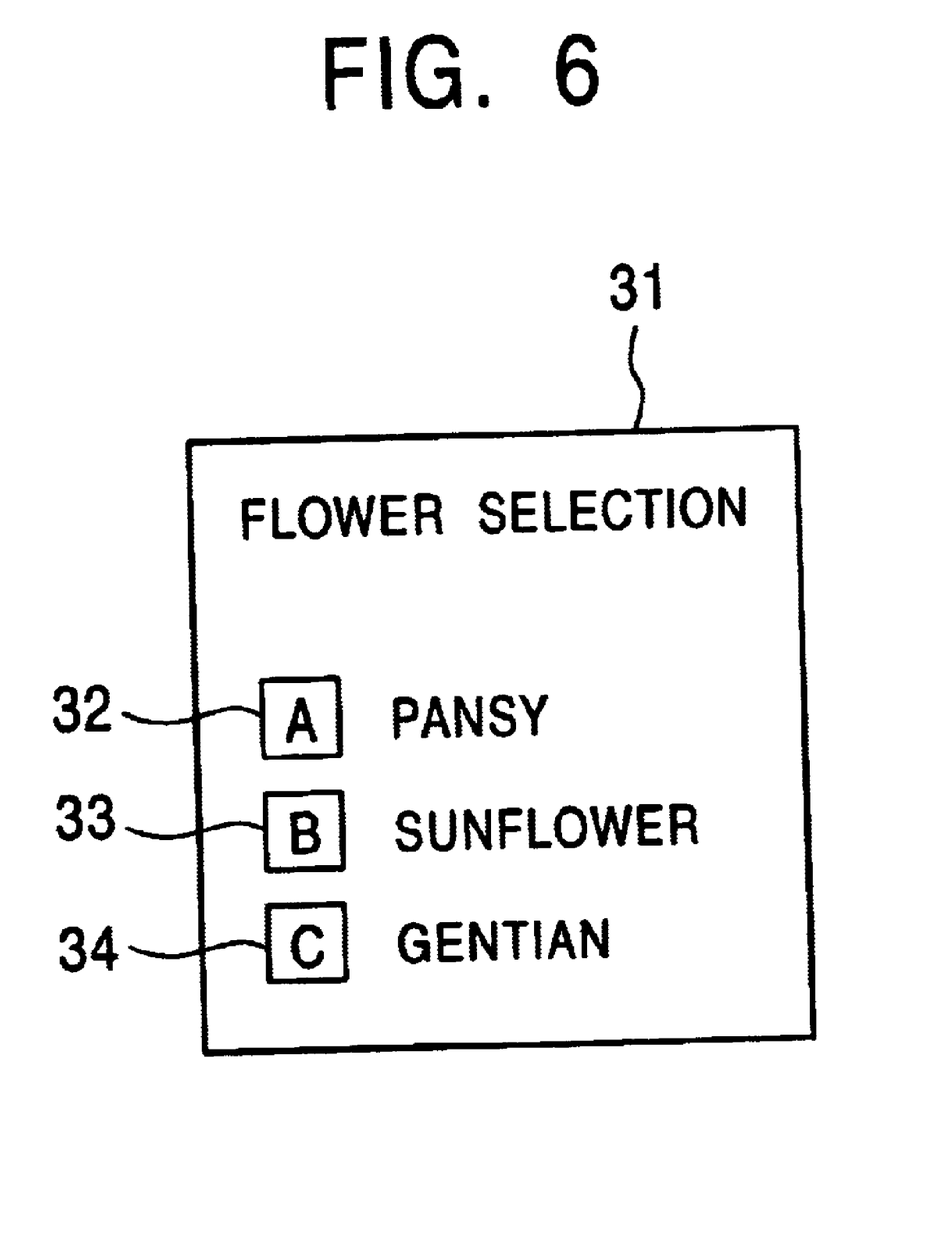
FIG. 6 illustrates a seed selection window 31.
Figure 7:
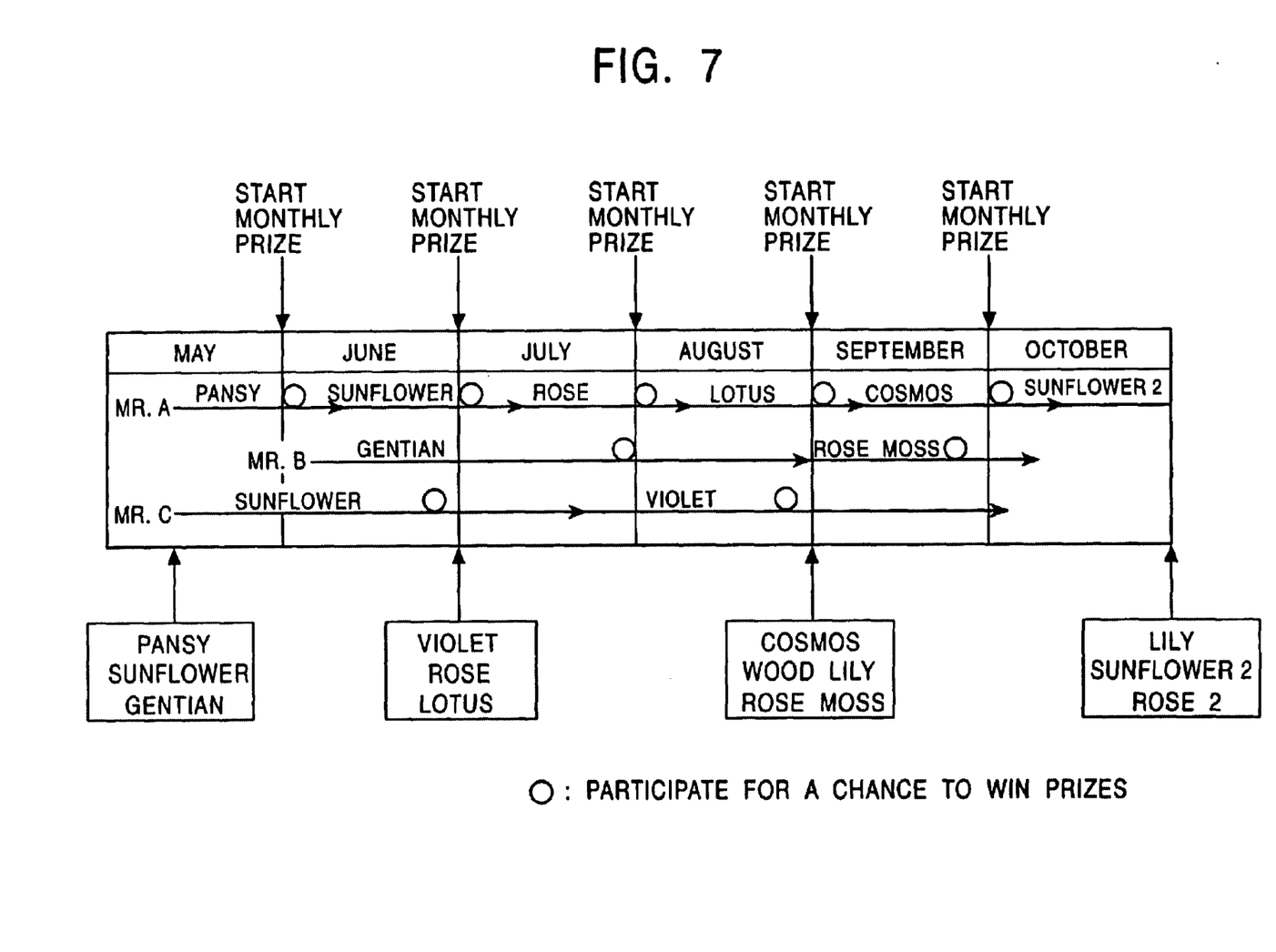
FIG. 7 illustrates seeds to be selected.

In the seed selection window 31, as shown in FIG. 6, three types of flowers to be selected, i.e., pansy, sunflower, and gentian, and buttons 32, 33, and 34 to be clicked when selecting the corresponding types of flower seeds are displayed. In clicking one of the buttons 32, 33, and 34, the corresponding information is sent to the CGI script via the Internet 4. The types of flower seeds to be selected are updated every two months, as shown in FIG. 7.

In step S7, the CGI script creates the cookie in which the ID information of the PC 5 running the WWW browser, the last access time and date, the cumulative counter value, the type of seed, the flower counter value, event participating flag, etc., are encrypted.

Figure 8A:
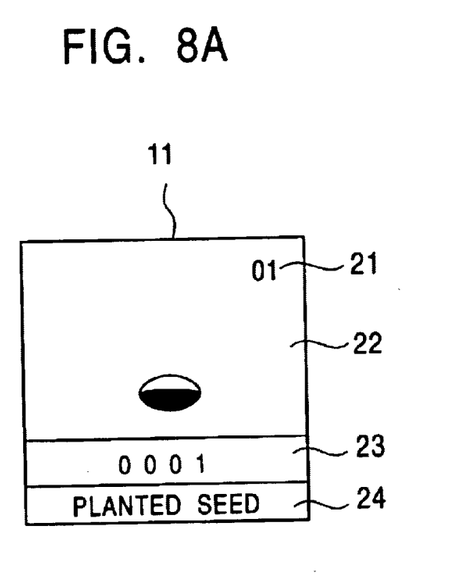
FIGS. 8A through 8D illustrate display examples of the access counter 11.
Figure 8B:
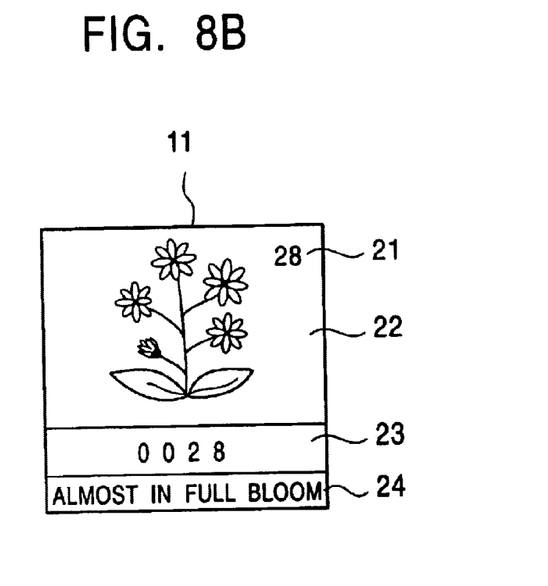

In step S8, the CGI script sends to the WWW browser via the Internet 4 image data of the access counter 11 (in this case, the image shown in FIG. 8A) corresponding to the information described in the cookie. More specifically, the image of the access counter 11 includes the flower counter value in the flower-counter-number display area 21, the type of seed and the flower image corresponding to the flower counter value in the flower-counter-image display area 22, the cumulative counter value in the cumulative-counter display area 23, and a message from the server 1 to the WWW browser user in the comment display area 24. The WWW browser then displays the access counter 11 on the display unit.

In step S9, the CGI script sends the cookie created in step S7 to the WWW browser via the Internet 4. The WWW browser then stores the received cookie in a storage medium built in the PC 5.

If it is found in step S2 that the cookie has been received from the PC 5, the process proceeds to step S10. The CGI script then determines in step S10 according to a predetermined method whether the received cookie is proper (whether it has not been illegally tampered with). If the result of step S10 is yes, the process proceeds to step S11.

The CGI script determines in step S11 whether the last access time and date described in the cookie is today. If the outcome is no, the process proceeds to step S12.

In step S12, the CGI script increments the cumulative counter value and the flower counter value described in the cookie by one. The CGI script then in step S13 determines whether the flower counter value is equal to or greater than a predetermined number (for example, 21). If the result of step S13 is yes, the process proceeds to step S14 in which the CGI script executes lucky chance processing.

The lucky chance is given to users who have accessed the homepage a predetermined number of times, for example, a chance to participate in a prize winning event. Details of the lucky chance processing are discussed below with reference to the flow chart of FIG. 9.

Figure 9:
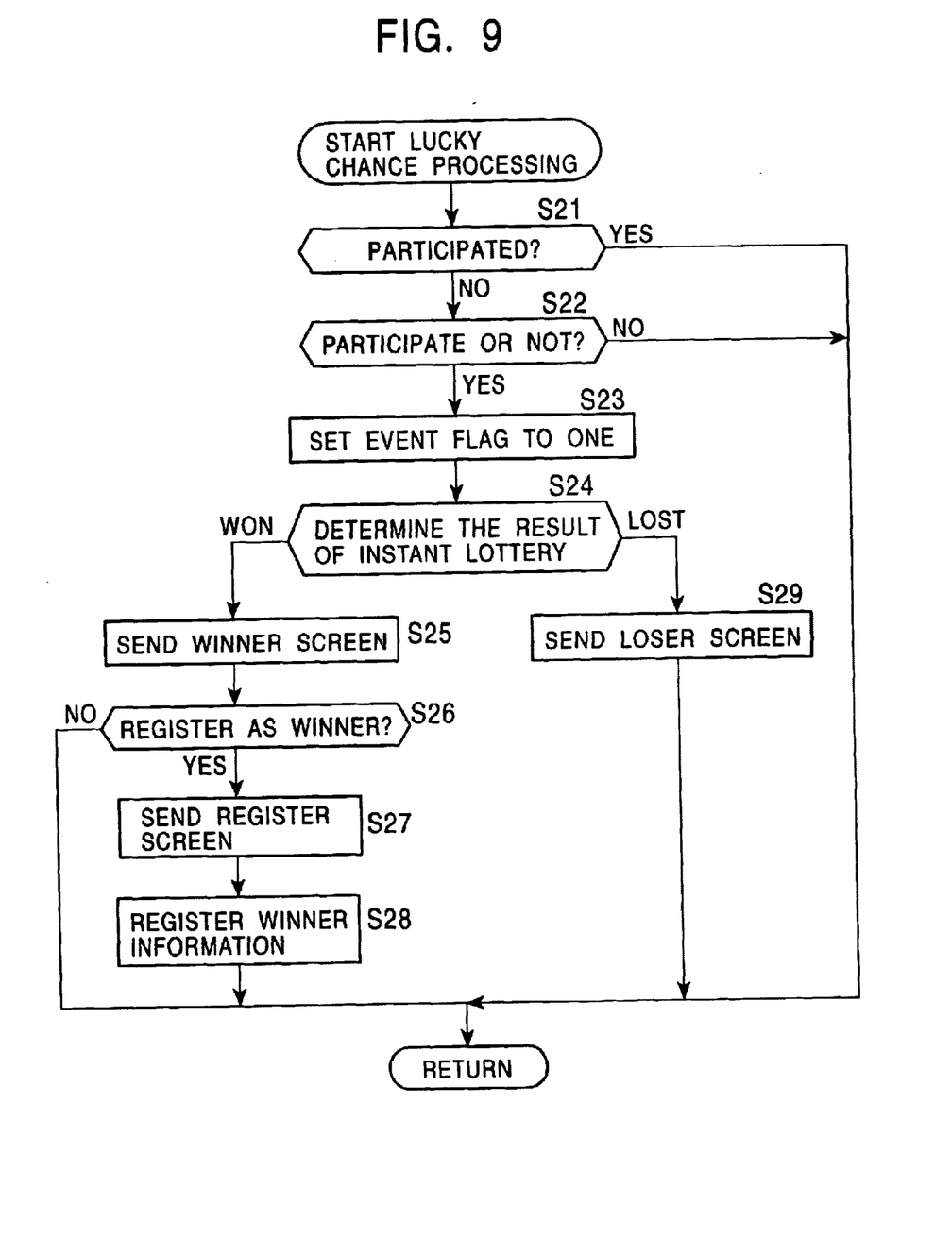
FIG. 9 is a flow chart illustrating lucky chance processing.

It is first determined in step S21 by reading the event participating flag described in the cookie whether the user has participated in the event. If it is found that the user has not yet participated in the event since the event participating flag indicates 0, the process proceeds to step In step S22, the CGI script sends the screen data of an instant lottery window 41, such as the one shown in FIG. 10, to the WWW browser via the Internet 4. The WWW browser then displays the instant lottery window 41 on the display unit.

Figure 10:
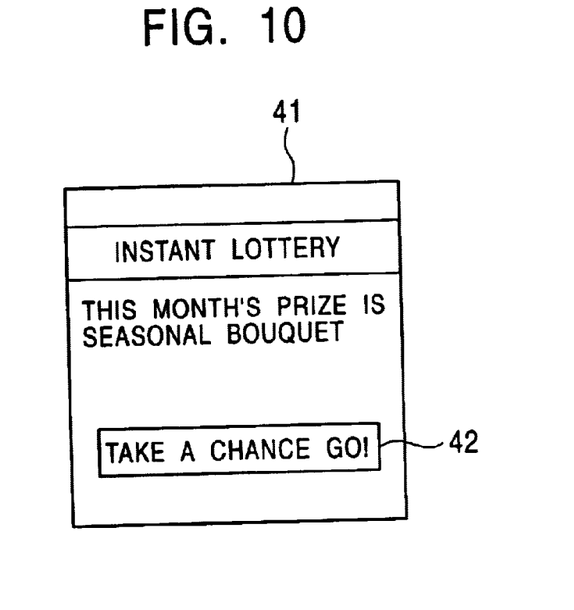
FIG. 10 illustrates an instant lottery window 41.

A "TAKE A CHANCE GO!" button 42, which is clicked when the user participates in the event, is indicated on the instant lottery window 41. When the "TAKE A CHANCE GO!" button 42 is clicked, the corresponding information is sent to a CGI script via the Internet 4.

The CGI script determines in step S22 whether the user has applied for participation in the event by clicking the "TAKE A CHANCE GO!" button 42. If the result of step S22 is yes, the process proceeds to step S23.

Figure 11:
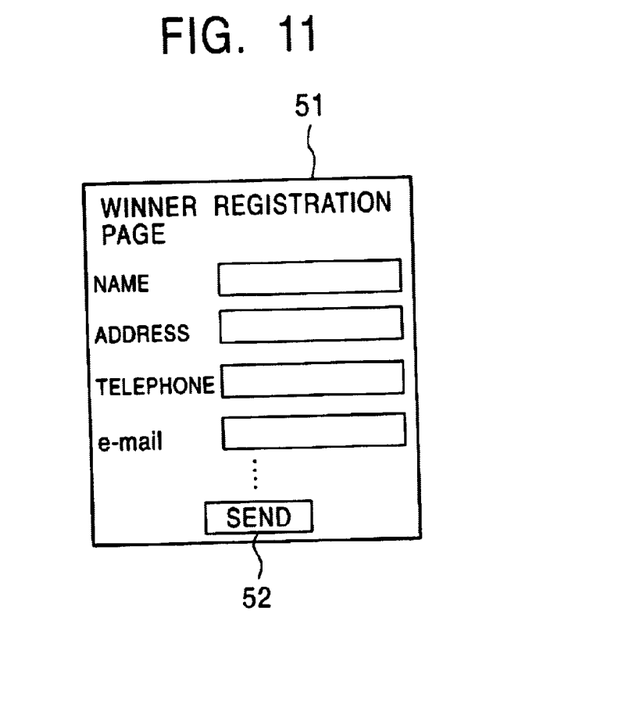
FIG. 11 illustrates a winner registration window 51.

In step S23, the CGI script sets the event participating flag described in the cookie to 1. Subsequently, the CGI script determines in step S24 the result of the instant lottery, i.e., whether the user has won or lost, according to a predetermined technique, for example, using random numbers. If the CGI script determines that the user has won, the process proceeds to step S25. In step S25, the CGI script sends winner screen data to the WWW browser via the Internet 4. The WWW browser then displays the winner screen on the display unit. A winner registration window 51 shown in FIG. 11 is linked to the winner screen.

The WWW browser determines in step S26 whether the user has applied for the winner registration by clicking the winner screen. If the outcome of step S26 is yes, the process proceeds to step S27.

In step S27, the WWW browser requests the server 1 to send the winner registration window 51 linked to the winner screen. In response to this request, the server program of the server 1 sends the HTML data corresponding to the winner registration window 51 to the WWW browser via the Internet 4. The WWW browser then displays the winner registration window 51 on the display unit.

In the winner registration window 51, columns for inputting information concerning the WWW browser user, and a send button 52 to be clicked when sending the input information are shown.

In step S28, the WWW browser user inputs the predetermined information in the input columns of the winner registration window 51 and clicks the send button 52. Then, the input information is sent to a CGI script of the server 1 via the Internet 4. The CGI script registers (records) the information of the winner, which is used for the subsequent processing, such as delivering the prize.

If it is found in step S24 that the user has lost in the instant lottery, the process proceeds to step S29. In step S29, the CGI script sends loser screen data to the WWW browser via the Internet 4. The WWW browser then displays the loser screen on the display unit, and the process returns to step S15 of FIG. 5.

Figure 5:
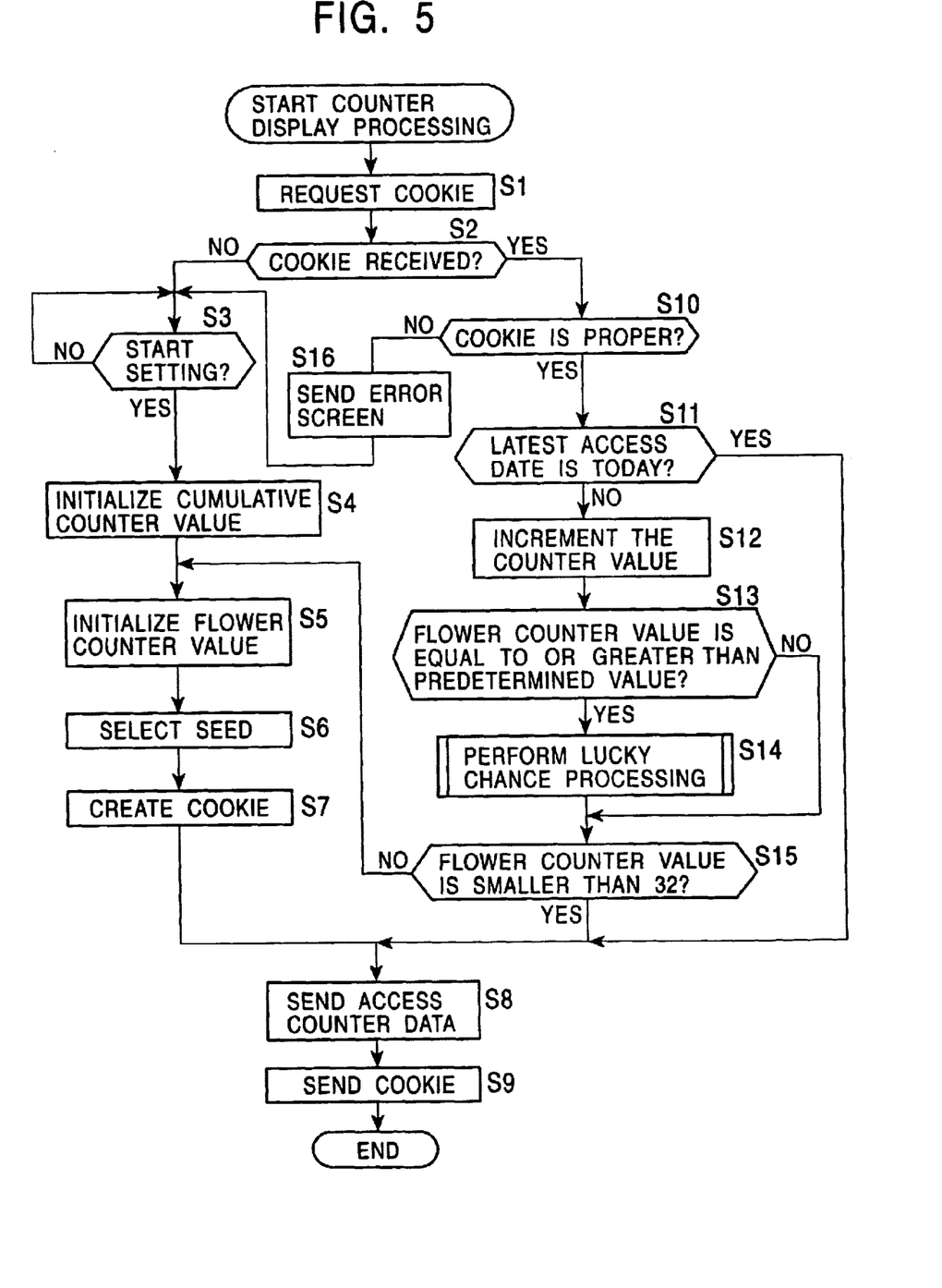
FIG. 5 is a flow chart illustrating counter display processing performed by the information processing system.

If it is found in step S21 that the user has already participated in the event since the event participating flag indicates 1, or in step S22 that the user has decided not to apply for participation in the event when the instant lottery window 41 is closed, or in step S26 that the user has decided not to register as a winner by erasing the winner screen without clicking, the lucky chance processing is completed, and the process returns to step S15 of FIG. 5.

The CGI script determines in step S15 whether the flower counter value is smaller than 32. If the result of step S15 is yes, the process proceeds to step S8.

Figure 8C:
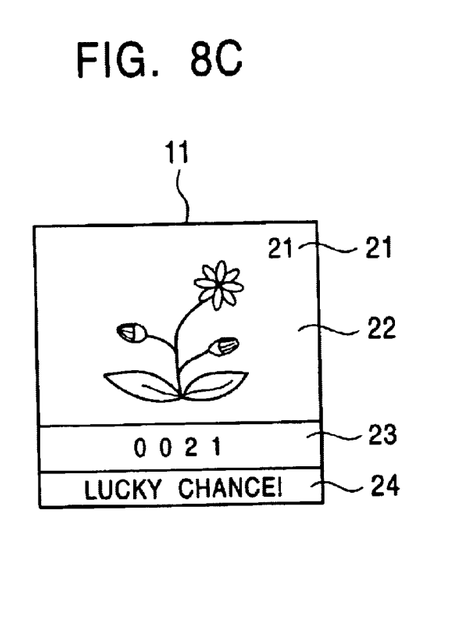

In step S8, a CGI script sends to the WWW browser via the Internet 4 the image data of the access counter 11 (for example, the image shown in FIG. 8C) corresponding to the information described in the cookie. When the flower counter value reaches a predetermined number (21) and when the event participating flag indicates 0, the message "LUCKY CHANCE" is indicated, as shown in FIG. 8C, in the comment display area 24 of the access counter 11.

Figure 8D:
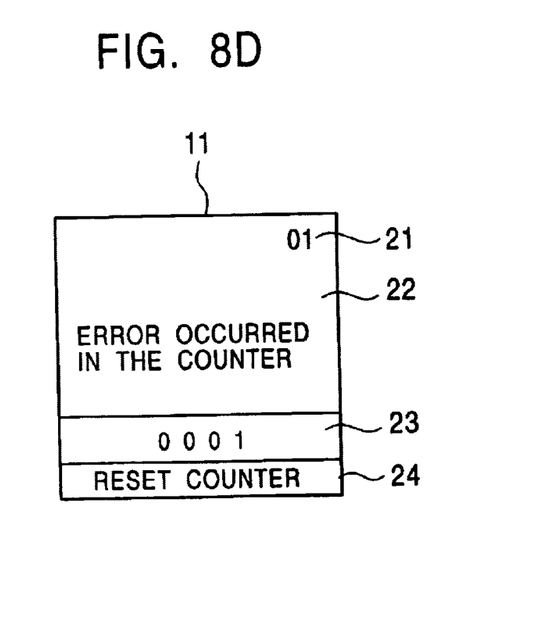

If it is found in step S10 that the received cookie is not proper, the process proceeds to step S16. Then, in step S16, a CGI script sends error display screen data of the access counter 11, such as the one shown in FIG. 8D, to the WWW browser via the Internet 4. Thereafter, the process returns to step S3, and the corresponding processing is repeated.

If it is found in step S11 that the last access time and date described in the cookie is today, steps S12 through S15 are skipped.

If it is determined in step S13 that the flower counter value is smaller than the predetermined value, step S14 is skipped. It may be determined in step S13 whether the cumulative counter value is equal to or greater than a predetermined value.

If it is found in step S15 that the flower counter value is not smaller than 32, the process returns to step S5, and the corresponding processing is repeated.

By executing the above-described counter display processing, every time the user of one of the PCs 5-1 through 5-n accesses the homepage set in the server 1, the user's own access counter counts the number of accesses, and not only the counter value, but also a growing plant image is displayed. In accessing the homepage a predetermined number of times, the user is able to participate in the prize-winning instant lottery, thereby encouraging the user to access the homepage again.

In the above-described counter display processing, the counters are incremented by only one a day. However, the increment of the counter may be changed by the user.

In the foregoing embodiment, every time the user accesses the homepage, the user's own access counter counts. However, the user's own access counter may count every time the user executes processing relating to the homepage. Alternatively, a combination of accessing the homepage and executing processing relating to the homepage may be reflected in the counter value. Processing relating to the homepage may include sending predetermined information to the server in which the homepage is set, purchasing articles or services sold on the homepage, and a combination of both processing. The predetermined information sent to the server may include user's individual attribute information and user's taste information.

The above-described access counter does not function for WWW browsers which are not compatible with cookies.

The aforementioned processing may be executed not only by software, but also by hardware. In executing the processing by software, programs forming the software are installed in a computer integrated into the server 1 (equivalent to the control unit 2), which serves as dedicated hardware, or in a computer which fulfills various functions by installing the programs, for example, a general-purpose PC.

Figure 12A:
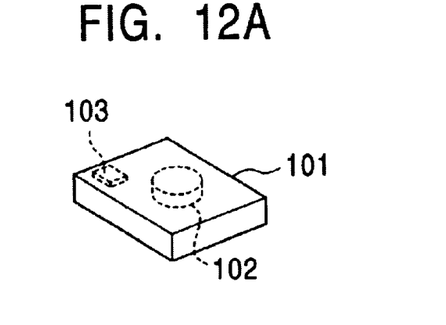
FIGS. 12A through 12C illustrate media used for installing a program in a computer and for executing the program by the computer.
Figure 12B:
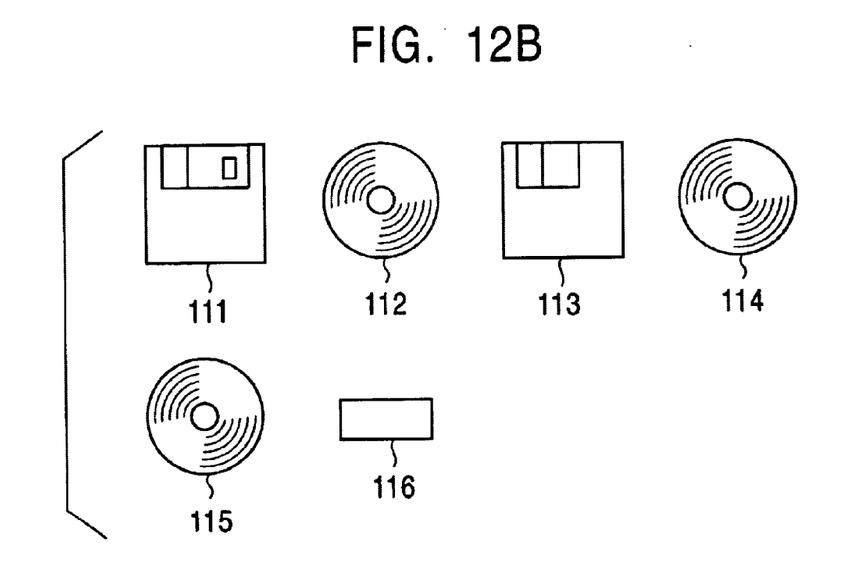
Figure 12C:
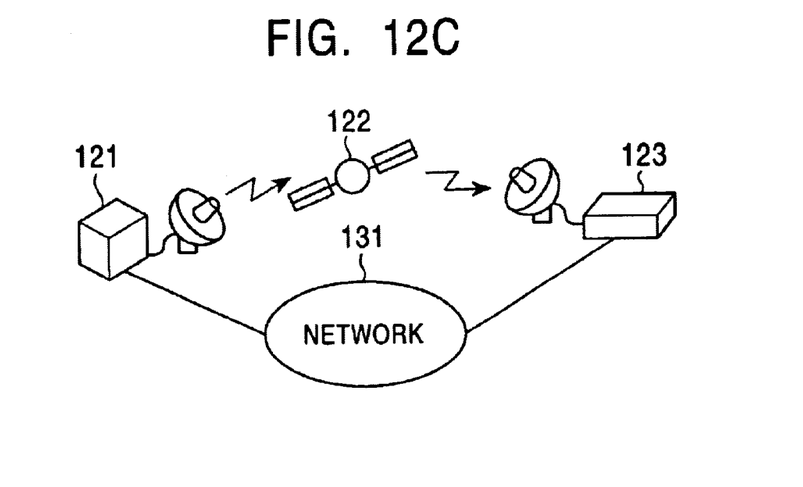

A description is now given, with reference to FIGS. 12A through 12C, of media used for installing a program implementing the above-described processing in a computer and for executing the program by the computer.

The program may be provided to the user, as illustrated in FIG. 12A, by being installed in a hard disk 102 or a semiconductor memory 103 used as a recording medium integrated into a computer 101.

Alternatively, the program may be provided as package software by being temporally or permanently stored, as shown in FIG. 12B, in a recording medium, such as a floppy disk 111, a compact disc-read only memory (CD-ROM) 112, a magneto optical (MO) disk 113, a digital versatile disc (DVD) 114, a magnetic disk 115, or a semiconductor memory 116.

The program may be transferred, as shown in FIG. 12C, from a download site 121 to a computer 123 by radio via a satellite 122, or by cable or radio via a network 131, such as a local area network (LAN) or the Internet, so as to be stored in a hard disk built in the computer 123.

The media discussed in the specification encompass the broadest concept including the above-described media.

The steps forming the program provided by the media may be executed according to the time-series order described in the specification. Alternatively, the above-described steps may not be executed in time-series order, and may be executed individually or in parallel.

In this specification, the system means the entire apparatus formed of a plurality of devices.

What is claimed is:

1. An information processing apparatus to be accessed from a plurality of information terminals via a network, comprising:

a generating component for generating first information in response to an access from one of the information terminals and for supplying the first information to the information terminal;

a receiving component for receiving the first information sent from the information terminal;

an incrementing component for incrementing an organism count and a cumulative count, according to a predetermined algorithm, wherein the organism count and the cumulative count are contained in the first information received by said receiving component;

an initializing component for resetting the organism count when the organism count has reached a predetermined reset value;

a sending component for sending image information to the information terminal, wherein the image information indicates a virtual organism which grows in accordance with the incrementing of the organism count and the image information indicates the cumulative count; and an event executing component for executing a predetermined event when the organism count has reached a predetermined event value.

2. An information processing apparatus according to claim 1, wherein the sending component sends different image information indicating different images showing corresponding states of growth of the virtual organism for different values of the organism count.

3. An information processing apparatus according to claim 1, wherein the predetermined event executed by the event executing component is a game that a user at the information terminal may participate in when the organism count has reached the event value.

4. An information processing apparatus according to claim 1, wherein the type of virtual organism indicated by the image data sent by the sending component to the information terminal changes when the organism count has reached the reset value.

5. An information processing apparatus according to claim 1, wherein the virtual organism grows in accordance with the incrementing of the organism count and the incrementing of the cumulative count.

6. An information processing apparatus according to claim 1, wherein the event executing component executes the predetermined event when the organism count has reached the event value and the cumulative count has reached a predetermined cumulative event value.

7. An information processing apparatus according to claim 1, wherein said incrementing component increments the organism count and the cumulative count by one a day in response to an access from the information terminal.

8. An information processing apparatus according to claim 7, wherein the first information comprises a cookie which includes identification information of the information terminal.

9. An information processing apparatus according to claim 8, further comprising a detection component for detecting an abnormality of the first information.

10. An information processing apparatus according to claim 7, wherein the first information comprises a cookie which includes the organism count for the information terminal.

11. An information processing apparatus according to claim 7, wherein the first information comprises a cookie which includes the cumulative count for the information terminal.

12. An information processing apparatus according to claim 7, wherein the first information comprises a cookie which includes an event participating flag for the information terminal, wherein the event participating flag indicates whether the information terminal has participated in an event since the later of when the organism count was initially set or last reset.

13. An information processing apparatus according to claim 7, wherein the first information comprises a cookie which includes an organism type value, wherein the organism type value indicates one of a plurality of types of virtual organisms to be indicated by the image data sent by the sending component to the information terminal.

14. An information processing apparatus according to claim 13, wherein one or more of the plurality of types of virtual organisms to be indicated by the image data changes after a predetermined period of time.

15. An information processing method for use in an information processing apparatus to be accessed from a plurality of information terminals via a network, comprising:

- a generating step of generating first information in response to an access from one of the information terminals and of supplying the first information to the information terminal;
- a receiving step of receiving the first information sent from the information terminal;
- an incrementing step of incrementing an organism count and a cumulative count, according to a predetermined algorithm, wherein the organism count and the cumulative count are contained in the first information received in said receiving step;
- an initializing step of resetting the organism count when the organism count has reached a predetermined reset value;
- a sending step of sending image information to the information terminal, wherein the image information indicates a virtual organism which grows in accordance with the incrementing of the organism count and the image information indicates the cumulative count; and
- an event executing step of executing a predetermined event when the organism count has reached a predetermined event value.

16. A computer program for processing accesses made from a plurality of information terminals via a network, comprising:

- a generating step of generating first information in response to an access from one of the information terminals and of supplying the first information to the information terminal;
- a receiving step of receiving the first information sent from the information terminal;
- an incrementing step of incrementing an organism count and a cumulative count, according to a predetermined algorithm, wherein the organism count and the cumulative count are contained in the first information received in said receiving step;
- an initializing step of resetting the organism count when the organism count has reached a predetermined reset value;
- a sending step of sending image information to the information terminal, wherein the image information indicates a virtual organism which grows in accordance with the incrementing of the organism count and the image information indicates the cumulative count; and
- an event executing step of executing a predetermined event when the organism count has reached a predetermined event value.

* * * * *